3,574,738
PROCESS OF SYNTHESIZING UREA
Ivo Mavrovic, 530 E. 72nd St., New York, N.Y. 10021
Filed Dec. 26, 1968, Ser. No. 787,059
Int. Cl. C07c 127/00
U.S. Cl. 260—555                    4 Claims

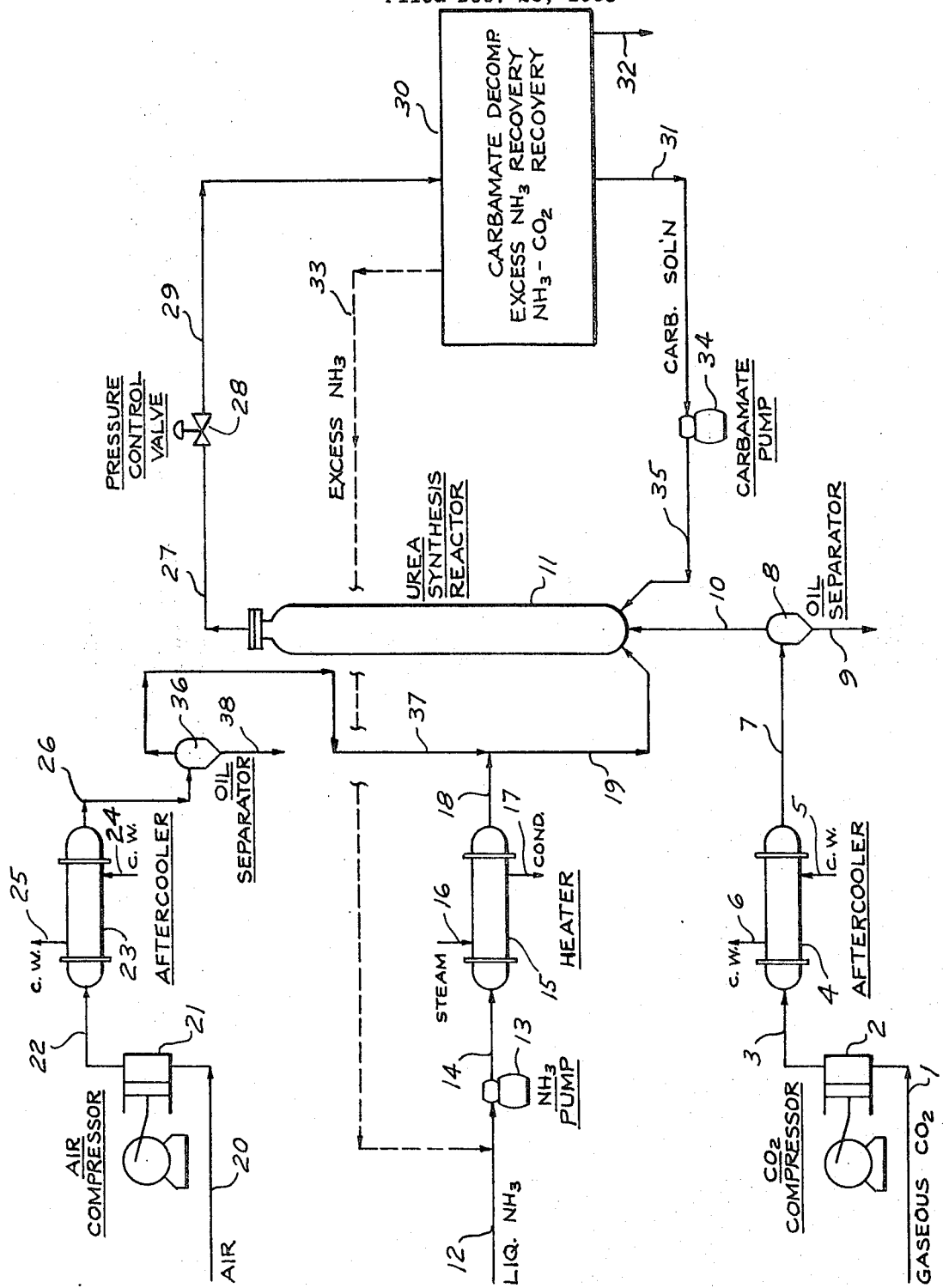

ABSTRACT OF THE DISCLOSURE

Corrosion of stainless steel equipment used for the synthesis of urea from ammonia and carbon dioxide is substantially prevented by dissolving oxygen or air in the liquid ammonia feed prior to its introduction into the reactor. Urea synthesis is effected under specific reaction conditions such as operation with a specific ratio of oxygen, ammonia, and water to carbon dioxide as well as under specific temperature and pressure conditions whereby a high conversion rate is achieved and the resulting urea product is of low turbidity and low iron content.

BACKGROUND OF THE INVENTION

(1) Field of the invention

The present invention relates to improvements in the preparation of urea from liquid ammonia and gaseous carbon dioxide or compounds thereof. More particularly, it relates to a method for preventing or inhibiting corrosion of the equipment employed in such urea synthesis reactions.

(2) Description of the prior art

Urea is generally synthesized by reacting a mixture of ammonia and carbon dioxide at elevated pressure and temperature in a high pressure equipment. Thereby ammonia and carbon dioxide react to form ammonium carbamate which is then dehydrated to urea. The first reaction step is more or less complete. The second reaction step, however, is incomplete and only part of the carbamate is dehydrated to urea. Excess ammonia above the stoichiometric amount in relation to carbon dioxide promotes dehydration of carbamate to urea.

The urea synthesis melt, usually containing urea, water, unreacted ammonium carbamate, and excess ammonia, is very corrosive and attacks very readily the synthesis apparatus which usually consists of stainless steel or other chromium alloys. It is common practice to feed oxygen or oxygen containing gas such as air, to the urea synthesis reactor with the purpose of maintaining the stainless steel surface of the apparatus in contact with the urea synthesis melt sufficiently passivated and thus more resistant to corrosion.

It is customary to feed air to the reactor for this purpose in an amount which is equivalent to about 2 moles to 3 moles of oxygen per 1,000 moles of carbon dioxide supplied corresponding to about 0.15% to 0.23% of oxygen in the carbon dioxide.

It has been found that although this relatively large amount of oxygen is benefiical with respect to preventing corrosion of the stainless steel reactor walls exposed to the corrosive urea melt, the large excess of oxygen therein is quite detrimental with respect to the conversion rate of carbamate to urea and thus to the overall yield of urea. The relatively large amount of air as used heretofore is not completely dissolved in the urea synthesis mixture under the urea synthesis conditions and flows in the gaseous state through hte urea synthesis apparatus. Due to the relatively high carbamate vapor pressure existing as ammonia and carbon dioxide in the reactor, the gaseous undissolved air phase will carry along a large amount of gaseous ammonia and carbon dioxide at the ratio of about 200 moles to 300 moles of ammonia and carbon dioxide per one mole of oxygen in the air (see Example 1 given hereinafter). Due to the fact that urea is formed by dehydration of the carbamate and that carbon dioxide must first react to form carbamate which is then converted to urea, the overall loss in carbon dioxide conversion to urea consequently will be proportional to the amount of carbon dioxide which did not react to form carbamate and which is maintained in the gaseous phase due to the presence of gaseous air. Thus the known process of preventing corrosion of the urea synthesis apparatus and equipment by the addition of large amounts of oxygen or air has the great disadvantage that the conversion rate of the reaction mixture is considerably reduced.

It has been noted that the relatively high air rate (see Example 1 given hereinafter) prevented the corrosion of the stainless steel apparatus according to the teaching of U.S. Pat. No. 2,727,069, but it also caused the turbidity of the solution to increase quite considerably above the average normal value obtained with less air feed to the reactor, and it also caused the conversion per pass of carbon dioxide to urea to decrease.

The rate of corrosion of the urea synthesis vessel walls is usually monitored by checking the content of iron in the urea product solution by chemical analysis. In the above mentioned example the iron content in the solution was about 0.4 p.p.m.

The turbidity of the urea product solution is usually caused by the urea byproducts, by the higher urea polymers, by nitrites, nitrates, and other compounds which are formed in a urea synthesis reactor in the presence of an excessive amount of oxygen or air. In Example 1 the turbidity of the solution was about 100 p.p.m. APHA Standard.

It has also been noted that by feeding air to the urea synthesis reactor at a rate which is lower than about 0.5 mole of oxygen per 1000 moles of carbon dioxide and operating at a pressure between 300 and 350 atmospheres according to the teaching of U.S. Patent No. 3,137,724 (see Example 3 given hereinafter), the turbidity of the reactor effluent solution was considerably lower than in the effluent solution obtained according to Example 1. At the same time, however, the corrosion rate of the urea synthesis reactor vessel walls increased by a factor of about 37.5, compared to the corrosion rate when proceeding according to said example. The iron content of the urea product solution was about 15 p.p.m.

It is very common in the industry that the gaseous carbon dioxide used to produce urea is contaminated with sulfur compounds, which are very much detrimental in combating the corrosion rate of the urea synthesis apparatus walls. Such contaminated carbon dioxide is usually passed through a sulfur removal apparatus before being used to synthesize urea. However, minute traces of sulfur compounds, in the order of magnitude of about 0.1–0.2 p.p.m., usually still remain present in the gaseous carbon dioxide due to the inability of the sulfur removal apparatus to operate in practice at an absolute 100% efficiency.

It was noted that when such purified gaseous carbon dioxide which still contains practically undetectable amounts of sulfur compounds in the range of less than 1 p.p.m. of sulfur, was used to synthesize urea at an oxygen level in the synthesis melt of less than about 0.5 mole of oxygen per 1000 moles of fresh carbon dioxide, the rate of corrosion of the urea synthesis apparatus walls and thus the concentration of iron in the reactor effluent urea solution increased quite rapidly by a factor of about 20 or 30.

It is customary that the oxygen or air is admixed to the carbon dioxide stream prior to compression. This procedure, however, has a number of disadvantages. When air is introduced into the reactor bottom via the gaseous carbon dioxide it is not immediately and completely dissolved into the reactor melt. This undissolved portion of air escapes upwardly very rapidly. As a result thereof the bottom part of the reactor does not receive a sufficient amount of oxygen and thus will be corroded. Furthermore, a considerable loss in conversion occurs because the upwardly escaping air carries along a considerable amount of ammonia gas and carbon dioxide, which thus are not given a sufficient residence time in the reactor to be converted to urea.

SUMMARY OF THE INVENTION

It is one object of the present invention to provide a simple and effective method of protecting the metallic surfaces of the urea synthesis equipment against corrosion without any substantial reduction in conversion rate and without substantially increasing the turbidity of the urea reactor effluent solution.

Other objects of the present invention and advantageous features thereof will become apparent as the description proceeds.

In principle the method according to the present invention comprises carrying out the urea synthesis under specific conditions, namely by operating at a pressure between about 180 atm. gauge and about 240 atm. gauge and at a temperature between about 185° C. and about 195° C. whereby oxygen in the form of air is admixed to the liquid ammonia in an amount which is equivalent to between about 0.6 mole and about 0.85 mole of oxygen per 1,000 moles of carbon dioxide fed to the reactor corresponding to 0.06% to 0.085%, by volume, calculated for the carbon dioxide. The overall mole ratio of ammonia to carbon dioxide in the urea synthesis reactor mixture is between 3.5 and 4.2:1 and preferably 3.8:1.

Water is also present in the reaction mixture in a molar ratio of water to carbon dioxide between about 0.5 to 0.7:1 and preferably of 0.6:1.

Furthermore, according to the present invention the oxygen or air is not introduced into the gaseous carbon dioxide as in the known processes but is admixed to the stream of liquid ammonia prior to the introduction into the reactor. Such oxygen or air is completely dissolved in the liquid ammonia before it reacts with carbon dioxide, and the tendency of such oxygen or air to escape upwards through the reactor is minimized. For this reason the reactor bottom section is much more protected against corrosion than when oxygen or air is admixed to the gaseous carbon dioxide prior to introduction into the reactor.

A further advantage of the present invention is that the unreacted carbamate is recovered from the reactor effluent. It is recycled back to the reactor as an ammoniacal aqueous solution of ammonium carbamate for total recovery and conversion into urea, along with fresh liquid ammonia and gaseous carbon dioxide reactor feed streams.

Addition of the small amount of oxygen of between about 0.6 mole and about 0.85 mole of oxygen dissolved in the liquid ammonia feed per 1000 moles of fresh carbon dioxide introduced into the reactor not only causes the stainless steel urea synthesis apparatus to retain its excellent anticorrosive properties, but also improves the overall urea yield by 10% to 20% compared to the yield achieved when feeding air together with the carbon dioxide into the urea synthesis reactor in an amount which is equivalent to 2 moles to 3 moles of oxygen per 1,000 moles of carbon dioxide fed into the reactor (see Examples 1 and 2 given hereinafter).

The above mentioned essential features of the present invention, namely (a) the presence in the urea synthesis system of an amount of oxygen between about 0.6 mole and 0.85 mole of oxygen per 1000 moles of carbon dioxide (b) which oxygen is admixed to and dissolved in the liquid ammonia before feeding the ammonia into the reactor (c) carrying out the reaction at a relatively low temperature between about 185° C. and about 195° C. and preferably at 190° C., and (d) at a relatively low pressure between about 180 atmospheres gauge and about 240 atmospheres gauge and preferably at 210 atmospheres gauge (e) with a ratio of ammonia to carbon dioxide between 3.5–4.2:1 and (f) in the presence of water in a ratio of water to carbon dioxide between about 0.5 mole and about 0.7 moles of water to 1 mole of carbon dioxide, (g) recovering the unreacted carbamate from the effluent of the reactor and (h) recycling said recovered carbamate in the form of an aqueous ammoniacal solution are responsible not only for (1) substantially preventing corrosion of the urea synthesis apparatus without any substantial decrease in overall carbon dioxide conversion to urea per pass in the reactor, but also for (2) an almost quantitative utilization of the fresh carbon dioxide fed to the urea synthesis reactor due to the recycling of the unreacted carbamate, (3) maximum utilization of the reactor space, and (4) the production of urea of low turbidity and (5) of a low iron content.

It is quite surprising that addition of such a small amount of oxygen or air to the liquid ammonia feed and operation at a relatively low temperature and pressure in the so-called liquid carbamate recycle system not only substantially prevents corrosion of the urea synthesis apparatus but also considerably increases the conversion rate and the overall yield of urea of excellent properties, compared to the procedure according to the prior art in which a relatively high amount of oxygen or air was used to prevent the corrosion of the urea synthesis apparatus.

The apparatus used in the urea synthesis process according to the present invention is the conventionally used reactor of stainless steel. A preferred stainless steel is composed, for instance, of 16% to 29% of chromium, 6% to 14% of nickel, 0% to 4% of molybdenum, and less than 0.1% of carbon. Other chromium-nickel steels may also be used, preferably such steels having at least 16% of chromium and 8% of nickel. Of course, the urea synthesis equipment may also consist of other material lined with such stainless steel. Other metals than molybdenum may be present in the nickel-chromium stainless steel apparatus such as zirconium, cobalt, tungsten, manganese, copper, and others.

BRIEF DESCRIPTION OF THE DRAWING

The present invention will be further described by reference to the attached drawing which illustrates diagrammatically the equipment used for urea synthesis according to the present invention.

DESCRIPTION OF THE PREFERRED EMBODIMENTS

As shown in FIG. 1, purified carbon dioxide is conducted through pipe 1 to compressor 2 wherein it is compressed to the required pressure. It is then passed through pipe 3 into after-cooler 4 wherein it is indirectly cooled by cooling water introduced into the shell side of after-cooler 4 through pipe 5 and discharged therefrom through pipe 6. Thereafter, the cooled compressed carbon dioxide is passed through pipe 7 into oil separator 8 wherein condensed oil and other impurities are separated from the carbon dioxide and are discharged through pipe 9. The purified compressed carbon dioxide is then conducted into the lower part of reactor 11.

Liquid ammonia is pumped by pump 13 through pipes 12 and 14 into heater 15 wherein it is indirectly heated by steam introduced through pipe 16 into the shell side of heater 15. The steam condensate is discharged through pipe 17. The heated liquid ammonia leaves heater 15 through pipe 18 and is mixed in pipe 19 with compressed air in the required amount.

Air is conducted into air compressor 21 through pipe 20. The compressed air is conducted through pipe 22 into after-cooler 23, wherein it is cooled by cooling water passing through the shell side of after-cooler 23. The cooled air is discharged from the after-cooler 23 through pipe 26 and is conducted to oil separator 36 and through pipe 37 to pipe 19 where it is mixed with and dissolved in the liquid ammonia discharged from heater 15 through pipe 18. Condensed oil and other impurities are discharged through pipe 38.

The liquid ammonia and air mixture is introduced through pipe 19 into the lower part of reactor 11. Through pipe 35 there is introduced into reactor 11 the recycled ammonium carbamate solution formed in the decomposition, absorption, and ammonia and carbon dioxide recovery section 30 which will be described hereinafter. The reactor 11 operates adiabatically at a temperature between about 180° C. and about 195° C. and at a pressure between about 180 atmospheres gauge and about 240 atmospheres gauge. The gaseous carbon dioxide fed to the reactor reacts instantaneously and totally with the stoichiometric amount of ammonia to form ammonium carbamate. The exothermic heat of reaction is utilized to adiabatically maintain the reactor mixture at the reaction temperature. The reactor effluent which contains urea, unreacted ammonium carbamate, excess ammonia, water, and air completely dissolved in the reactor effluent solution is delivered through pipe 27, pressure control valve 28, and pipe 29 into the recovery unit 30 wherein the unreacted carbamate is decomposed to carbon dioxide and ammonia which are separated from the urea solution. The urea solution is discharged through pipe 32. Ammonia and carbon dioxide are thereafter recondensed to ammonium carbamte which is redissolved in water with part of the excess ammonia and is recycled for complete utilization back into reactor 11 through pipe 31, carbamate pump 34, and pipe 35. The remaining portion of excess ammonia is recycled back through pipe 33 into pipe 12 to join the main stream of fresh liquid ammonia fed into the reactor.

The material of which the urea synthesis equipment is constructed is stainless steel or other chromium-nickel steels containing, for instance, from 16% to 20% of chromium, 8% to 14% of nickel, and 1.75% to 4% of molybdenum and zirconium.

The following more specific examples serve to illustrate the present invention in detail without, however, limiting the same thereto.

EXAMPLE 1

Procedure according to U.S. Patent No. 2,727,069

The following amounts per hour of reaction components are introduced into reactor 11:

(a) A mixture of 12,400 parts of carbon dioxide and 117 parts of air corresponding to 27 parts of oxygen and 90 parts of nitrogen is introduced into the compressor 2, compressed therein to a pressure of about 210 atmospheres gauge, and after cooling in after-cooler 4 to 90° C. and de-oiling in oil separator 8, is introduced into reactor 11.

(b) Simultaneously 20,650 parts of liquid ammonia are pumped into reactor 11 through heater 15 wherein the ammonia is heated to 90° C.

(c) 23,150 parts of an ammonium carbamate solution as it is recovered from the recovery unit 30 at 90° C., is recycled into reactor 11.

The three components are reacted in reactor 11 at a temperature of 190° C. and a pressure of 210 atmospheres gauge.

The reactor effluent consists of a gaseous phase of the following composition:

| | Parts |
|---|---|
| Carbon dioxide | 1,530 |
| Ammonia | 2,380 |
| Water | 126 |
| Air | 81 |
| Total of gaseous effluent | 4,117 | and of a liquid phase composed of

| | Parts |
|---|---|
| Urea | 16,800 |
| Ammonium carbamate | 10,550 |
| Ammonia | 14,100 |
| Water | 10,714 |
| Air | 36 |
| Total of liquid effluent | 52,200 |

The gaseous and liquid reactor effluents are delivered to the ammonia-carbon dioxide recovery section 30.

The recondensed ammonium carbamate solution which is recycled from the recovery section 30 to the reactor 11 is composed of

| | Parts |
|---|---|
| Carbon dioxide | 7,400 |
| Ammonia | 9,950 |
| Water | 5,800 |
| Total | 23,150 |

Excess ammonia recovered from the recovery section 30 is recycled through pipe 33 to the ammonia feed pipe 12.

The oxygen ratio in the reaction mixture is $$\frac{\text{moles } O_2}{1000 \text{ moles } CO_2} = 3$$

The reactor effluent has a molar ratio of $\frac{NH_3}{CO_2} = 4$ and a molar ratio of $\frac{H_2O}{CO_2} = 0.72$ whereby the synthesis water is excluded.

The conversion rate is 62%. The iron content of the reactor effluent is 0.4 p.p.m. and the turbidity is 100 p.p.m. APHA Standard.

Thus, a ratio of three moles of oxygen to 1000 moles of carbon dioxide, corresponding to 0.3%, by volume, of oxygen calculated for carbon dioxide freshly introduced into the apparatus yields a urea product of a satisfactory iron content but of a relatively high turbidity and with a relatively low conversion rate.

EXAMPLE 2

Procedure according to the present invention

The following amounts per hour of reaction components are introduced into reactor 11:

(a) 12,400 parts of carbon dioxide, compressed to a pressure of 210 atmospheres gauge and cooled to 65° C. are introduced into reactor 11.

(b) A mixture of 19,520 parts of liquid ammonia mixed, after heating to 70° C., with 28.0 parts of air, i.e. 21.6 parts of nitrogen and 6.4 parts of oxygen, compressed and cooled to 70° C., is introduced into the reactor 11.

(c) An ammonium carbamate solution of

| | Parts |
|---|---|
| Carbon dioxide | 5,200 |
| Ammonia | 7,680 |
| Water | 5,050 |
| Total of | 17,930 | as recovered from the recovery section 30 at 88° C., is recycled into the reactor 11.

The reaction temperature is 190° C. and the reaction pressure 210 atmospheres gauge.

The reactor effluent is a liquid of the following composition:

| | Parts |
|---|---|
| Urea | 16,800 |
| Ammonium carbamate | 9,360 |
| Ammonia | 13,600 |
| Water | 10,090 |
| Air | 28 |
| Total of liquid effluent | 49,878 |

Said liquid effluent is delivered to the ammonia-carbon dioxide recovery section 30.

Excess ammonia recovered from the recovery section 30 is recycled to the ammonia feed pipe 12 through pipe 33.

The oxygen ratio in the reaction mixture is $$\frac{\text{moles of } O_2}{1000 \text{ moles of fresh } CO_2} = 0.71$$

The reactor effluent has a molar ratio of $\frac{NH_3}{CO_2} = 4$ and a molar ratio of $\frac{H_2O}{CO_2} = 0.71$ thereby excluding the synthesis water.

The conversion rate is 70%. The iron content of the reactor effluent is 0.5 p.p.m. and the turbidity is 35 p.p.m. APHA Standard.

Thus when proceeding according to the present invention and introducing 0.7 mole of oxygen per 1000 moles of carbon dioxide into the reactor, the conversion rate is appreciably higher, namely about 13% higher, and the turbidity of the resulting urea solution is within the commercially acceptable range of about 35 p.p.m. APHA Standard in comparison to the lower conversion rate and the considerably higher turbidity of the urea solution produced according to Example 1 with a considerably higher oxygen ratio. The corrosion rate of the urea synthesis apparatus walls is also very low and about as low as when admixing larger amounts of oxygen and the iron content of the reactor effluent is about the same as that of Example 1.

EXAMPLE 3

Procedure according to U.S. Patent No. 3,137,724

The following amounts per hour of reaction components are introduced into reactor 11:

(a) A mixture of 12,400 parts of carbon dioxide and 7.8 parts of air corresponding to 6.0 parts of nitrogen and 1.8 parts of oxygen, is introduced into the compressor 2, compressed therein to a pressure of 320 atmospheres gauge, and after cooling to 60° C. in aftercooler 4 and de-oiling in oil separator 8, is introduced into reactor 11.

(b) Simultaneously 20,120 parts of liquid ammonia are pumped into the reactor 11 through heater 15, wherein the ammonia is heated to 100° C.

(c) An ammonia carbamate solution of

| | Parts |
|---|---|
| Carbon dioxide | 4,760 |
| Ammonia | 6,400 |
| Water | 3,700 |
| Total | 14,860 | as recovered from the recovery section 30 at 90° C., is recycled into the reactor 11.

The reaction temperature is 200° C. and the reaction pressure 320 atmospheres gauge.

The liquid reactor effluent is composed as follows:

| | Parts |
|---|---|
| Urea | 16,800 |
| Carbon dioxide | 4,840 |
| Ammonia | 17,000 |
| Water | 8,740 |
| Air | 7.8 |
| Total | 47,387.8 |

Said effluent is delivered to the ammonia-carbon dioxide recovery section 30.

Excess ammonia recovered from the recovery section 30 is recycled to the ammonia feed pipe 12 through pipe 33.

The oxygen ratio in the reaction mixture is $$\frac{\text{moles } O_2}{1000 \text{ moles } CO_2} = 0.2$$

The reactor effluent has a molar ratio of $\frac{NH_3}{CO_2} = 4$ and a molar ratio of $\frac{H_2O}{CO_2} = 0.53$ thereby excluding the synthesis water.

The conversion rate is 72%. The iron content of the reactor effluent is 15 p.p.m. and the turbidity is 20 p.p.m. APHA Standard.

Thus, when further reducing the oxygen content to an oxygen ratio below 0.5 and operating at a higher pressure and temperature as disclosed in U.S. Patent No. 3,137,-724, the conversion rate is only slightly increased over that of Example 2, mainly because of less water present in the reactor. The corrosion rate of the urea synthesis reactor walls, however, is increased by a factor of about 30, namely to 15 p.p.m., in contrast to 0.5 p.p.m. according to Example 2, i.e. to an extent which is practically not acceptable.

EXAMPLE 4

Procedure according to the present invention

The following amounts per hour of reaction components are introduced into reactor 11:

(a) 12,400 parts of carbon dioxide, compressed to a pressure of 210 atmospheres gauge and cooled to 65° C. are introduced into reactor 11.

(b) 18,900 parts of liquid ammonia are mixed, after heating to 70° C., with 27 parts of air, i.e. 20.8 parts of nitrogen and 6.2 parts of oxygen, compressed and cooled to 70° C. The mixture is also introduced into reactor 11.

(c) An ammonium carbamate solution of

| | Parts |
|---|---|
| Carbon dioxide | 5,720 |
| Ammonia | 7,700 |
| Water | 4,460 |
| Total | 17,880 | is recovered from the recovery section 30 at 88° C. and recycled into the reactor 11.

The reaction temperature is 190° C. and the reaction pressure 210 atmospheres gauge.

The liquid reactor effluent is composed of

| | Parts |
|---|---|
| Urea | 16,800 |
| Ammonium carbamate | 10,281 |
| Ammonia | 12,599 |
| Water | 9,500 |
| Air | 27 |
| Total liquid effluent | 49,207 |

Said effluent is delivered to the ammonia-carbon dioxide recovery section 30.

Excess ammonia recovered from the recovery section 30 is recycled to the ammonia feed pipe 12 through pipe 33.

The oxygen ratio in the reaction mixture is $$\frac{\text{moles } O_2}{1000 \text{ moles } CO_2} = 0.69$$

The reactor effluent has a molar ratio of $\frac{NH_3}{CO_2} = 3.8$ and a molar ratio of $\frac{H_2O}{CO_2} = 0.6$ thereby excluding the synthesis water.

The conversion rate is 68%. The iron content of the reactor effluent is 0.5 p.p.m. and the turbidity is 30 p.p.m. APHA Standard.

This example, like Example 2, also shows that by proceeding according to the present invention the conversion rate is considerably increased and the turbidity is markedly decreased compared with the respective data obtained when proceeding according to Example 1, i.e. according to U.S. Patent No. 2,727,069, while compared with the procedure according to U.S. Patent No. 3,137,724 the anticorrosive effect is many times improved.

EXAMPLE 5

Procedure according to U.S. Patent No. 3,137,724 but at a lower temperature and pressure The following amounts per hour of reaction components are introduced into reactor 11:

(a) A mixture of 12,400 parts of carbon dioxide and 7.8 parts of air corresponding to 6.0 parts of nitrogen and 1.8 parts of oxygen, is introduced into the compressor 2, compressed therein to a pressure of 210 atmospheres gauge, and after cooling to 65° C. in after-cooler 4 and de-oiling in oil separator 8, is introduced into reactor 11.

(b) Simultaneously 19,520 parts of liquid ammonia are pumped into the reactor 11 through heater 15 wherein the ammonia is heated to 70° C.

(c) An ammonium carbamate solution of

| | Parts |
|---|---|
| Carbon dioxide | 5,200 |
| Ammonia | 7,680 |
| Water | 5,050 |
| Total | 17,930 | as recovered from the recovery section at 88° C., is recycled into the reactor 11.

The reaction temperature is 190° C. and the reaction pressure 210 atmospheres gauge.

The reactor effluent is composed as follows:

| | Parts |
|---|---|
| Urea | 16,800 |
| Carbon dioxide | 5,280 |
| Ammonia | 17,680 |
| Water | 10,090 |
| Air | 7.8 |
| Total | 49,875.8 |

Said effluent is delivered to the ammonia-carbon dioxide recovery section 30.

Excess ammonia recovered from the recovery section 30 is recycled to the ammonia feed pipe 12 through pipe 33.

The oxygen ratio in the reaction mixture is $$\frac{\text{moles } O_2}{1000 \text{ moles } CO_2} = 0.2$$

The reactor effluent has a molar ratio of $\frac{NH_3}{CO_2} = 4$ and a molar ratio of $\frac{H_2O}{CO_2} = 0.71$ thereby excluding the synthesis water.

The conversion rate is 70%. The iron content of the reactor effluent is 15 p.p.m. and the turbidity is 20 p.p.m. APHA Standard.

Thus when proceeding according to U.S. Patent No. 3,137,724 with a low oxygen ratio and reducing the reaction pressure and temperature to that employed according to the present invention, the corrosion rate is increased very considerably to 15 p.p.m. while the conversion rate is not substantially increased over that obtained in Example 2, i.e. when proceeding according to the present invention.

The following table clearly shows the superior results achieved, when proceeding according to the present invention, in comparison with the results obtained according to the prior art.

| Example Number | Reactor Temperature, °C. | Reactor Pressure, atm. gauge | Oxygen ratio [1] | Molar ratio NH₃/CO₂ | Molar ratio H₂O/CO₂ | Conversion rate, percent | Iron content, p.p.m. | Turbidity p.p.m., APHA Standard |
|---|---|---|---|---|---|---|---|---|
| 1 | 190 | 210 | 3 | 4 | 0.72 | 62 | 0.4 | 100 |
| 2 | 190 | 210 | 0.71 | 4 | 0.71 | 70 | 0.5 | 35 |
| 3 | 200 | 320 | 0.2 | 4 | 0.53 | 72 | 15.0 | 20 |
| 4 | 190 | 210 | 0.69 | 3.8 | 0.6 | 68 | 0.5 | 30 |
| 5 | 190 | 210 | 0.2 | 4 | 0.71 | 70 | 15.0 | 20 |

[1] Oxygen ratio = $\frac{\text{moles } O_2}{1{,}000 \text{ moles } CO_2}$

I claim:

1. In the process of producing urea by reacting ammonia and carbon dioxide at urea forming temperature and pressure conditions in urea synthesis apparatus provided with stainless steel surfaces, the improvement consisting in
   (a) admixing oxygen to, and dissolving in, the liquid ammonia before feeding the ammonia into the reactor,
   (b) said oxygen being admixed in an amount between about 0.6 mole and about 0.85 mole of oxygen per 1000 moles of carbon dioxide, whereby
   (c) the ratio of ammonia to carbon dioxide in the reactor is between about 3.5–4.2 moles of ammonia to 1 mole of carbon dioxide and (d) the ratio of water to carbon dioxide in the reactor is between about 0.5–0.7 mole of water to 1 mole of carbon dioxide, whereby
(e) the reaction is carried out at a temperature between about 185° C. and about 195° C. and
(f) at a pressure between about 180 atmospheres gauge and about 240 atmospheres gauge, and whereby
(g) unreacted carbamate is recovered from the effluent of the reactor and is
(h) recycled as an aqueous ammoniacal carbamate solution to the reactor.

2. The process of producing urea according to claim 1, wherein the oxygen is supplied in the form of air.

3. The process of producing urea according to claim 1, wherein the oxygen is admixed in an amount between about 0.68 mole and about 0.07 mole of oxygen per 1000 moles of carbon dioxide and the reaction is carried out at about 190° C. and a pressure of about 210 atmospheres gauge.

4. The process of producing urea according to claim 2, wherein the oxygen is admixed in an amount between about 0.68 mole and about 0.70 mole of oxygen per 1000 moles of carbon dioxide and the reaction is carried out at about 190° C. and a pressure of about 210 atmospheres gauge.

References Cited
UNITED STATES PATENTS 2,680,766   6/1954   De Ropp _____ 260—555

BERNARD HELFIN, Primary Examiner

M. W. GLYNN, Assistant Examiner